(12) United States Patent
Maddalozzo, Jr. et al.

(10) Patent No.: US 7,768,501 B1
(45) Date of Patent: Aug. 3, 2010

(54) METHOD AND SYSTEM FOR TOUCH SCREEN KEYBOARD AND DISPLAY SPACE SHARING

(75) Inventors: John Maddalozzo, Jr., Austin, TX (US); Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/071,189

(22) Filed: May 1, 1998

(51) Int. Cl.
  *G06F 3/041* (2006.01)
(52) U.S. Cl. .................. 345/173; 345/163; 345/168; 345/174
(58) Field of Classification Search ......... 345/156–168, 345/173–179; 361/680, 682, 683; 178/18.01–18.07, 178/19.01–19.05
See application file for complete search history.

(56) References Cited

U.S. PATENT DOCUMENTS

| | | | | |
|---|---|---|---|---|
| 5,267,327 A | * | 11/1993 | Hirayama | 382/13 |
| 5,491,495 A | * | 2/1996 | Ward et al. | 345/173 |
| 5,543,588 A | * | 8/1996 | Bisset | 178/18 |
| 5,581,243 A | | 12/1996 | Ouellette et al. | 345/173 |
| 5,675,362 A | * | 10/1997 | Clough et al. | 345/173 |
| 5,748,185 A | * | 5/1998 | Stephan et al. | 345/173 |
| 5,767,457 A | * | 6/1998 | Gerpheide et al. | 178/18 |
| 5,777,605 A | * | 7/1998 | Yoshinobu et al. | 345/173 |
| 5,778,404 A | * | 7/1998 | Capps et al. | 345/179 |
| 5,838,302 A | * | 11/1998 | Kuriyama et al. | 345/173 |
| 5,956,020 A | * | 9/1999 | D'Amico et al. | 345/173 |
| 6,029,214 A | * | 2/2000 | Dorfman et al. | 710/73 |

* cited by examiner

*Primary Examiner*—Vijay Shankar
(74) *Attorney, Agent, or Firm*—Dillon & Yudell LLP (57) ABSTRACT

A method and system in a portable computer having a display screen for increasing portable computer compactness. Data is displayed initially within the display screen. The display screen is then partitioned into a touch-sensitive input area and a display area, wherein data input at the touch-sensitive input area may be simultaneously displayed in the display area, in response to a particular user input. A test is performed to detect if a user's hands are positioned at the touch-sensitive input area. A touch-sensitive pad is thereafter graphically displayed at the touch-sensitive input area within the display screen, in response to detecting a user's hands positioned at the touch-sensitive area, wherein a user may enter data that may be simultaneously displayed in the display area. An additional test may then be performed to detect if the user's hands are no longer positioned at the touch-sensitive input area. The touch-sensitive pad is subsequently concealed from view, in response to detecting if the user's hands are no longer positioned at the touch-sensitive input area. The touch-sensitive pad graphically displayed at the touch-sensitive input area within the display screen may be composed of a touch-sensitive keyboard, which may in and of itself be an ergonomic keyboard.

21 Claims, 8 Drawing Sheets

METHOD AND SYSTEM FOR TOUCH SCREEN KEYBOARD AND DISPLAY SPACE SHARING

BACKGROUND OF THE INVENTION

1. Technical Field

The present invention relates to improved information-retrieval methods and systems. In particular, the present invention relates to improved information-retrieval methods and systems utilized in association with graphical user interface devices. More particularly, the present invention relates to portable computers. Still more particularly, the present invention relates to touch screen display units. Finally, the present invention relates to methods and systems for saving space in touch screen keyboard and display devices.

2. Description of the Related Art

Touch screen technology is increasingly being utilized in all facets of data-processing applications. A touch screen is a display device that allows users to interact with a computer system by touching a particular area on the surface of the screen. Touch screen technology can be implemented by any of a number of sensing techniques. For example, touch screen technology can be implemented by detecting disturbances on a screen utilizing the fingers of a user. Typically, this disturbance is detected through the interruption or detection of heat on the screen.

Touch screen technology is increasingly being implemented in association with portable computers, such as so-called "laptop" and "notebook" computers, and small calculator-size mini-portable computers. As devices become increasingly portable in nature, the need for smaller and more compact devices increases. Thus, a problem encountered in decreasing the size of portable computers is the need to save space.

For example, in most portable computers, two distinct spaces are required. First, a panel for the display itself and second, a section for the computer keyboard. These two requirements add weight, cost and size to the design of a laptop computer. Touch screen technology offers an alternative approach around such spatial restrictions. However, to date, touch screen technology usually includes keyboards that occupy distinct areas away from the display, or when combined with the display, are uncomfortable and awkward for the user to access. An example of a touch screen display can be found in U.S. Pat. No. 5,581,243, "Method and Apparatus for Displaying Simulated Keyboards on Touch-Sensitive Dislays," by Ouellette et al. Such touch screen keyboards, while advancing the art, do not permit users to access touch screen keyboards in an efficient and versatile manner. The challenge lies in crafting a portable computer in which compactness and versatility is improved by incorporating touch screen keyboards that are easy to access and use.

Based on the foregoing, it can be appreciated that a need exists to reduce the size of portable computers, which in turn saves on the parts necessary to construct such computers. As a result of reducing the size of the touch screen, portable computers which utilize touch screen technology may be constructed with greater compactness and efficiency. It is believed that the disclosure provided addresses and solves these problems in a unique and previously unknown manner.

SUMMARY OF THE INVENTION

It is therefore an object of the invention to provide an improved information-retrieval method and system.

It is another object of the invention to provide improved information-retrieval methods and systems utilized in association with graphical user interface devices.

It is yet another object of the invention to provide an improved portable computer system.

It is still another object of the invention to provide an improved touch screen display unit which may be utilized in association with information-retrieval systems.

It is another object of the invention to provide a method and system for promoting increased compactness in portable computer systems by reducing the space consumed by display screens and user input devices utilized in such computer systems.

The above and other objects are achieved as is now described. A method and system are disclosed in a portable computer having a display screen for increasing portable computer compactness. Data is displayed initially within the display screen. The display screen is then partitioned into a touch-sensitive input area and a display area, wherein data input at the touch-sensitive input area may be simultaneously displayed in the display area, in response to a particular user input. A test is performed to detect if a user's hands are positioned at the touch-sensitive input area. A touch-sensitive pad is thereafter graphically displayed at the touch-sensitive input area within the display screen, in response to detecting a user's hands positioned at the touch-sensitive area, wherein a user may enter data that may be simultaneously displayed in the display area.

An additional test may then be performed to detect if the user's hands are no longer positioned at the touch-sensitive input area. The touch-sensitive pad is subsequently concealed from view, in response to detecting if the user's hands are no longer positioned at the touch-sensitive input area. The touch-sensitive pad graphically displayed at the touch-sensitive input area within the display screen may be composed of a touch-sensitive keyboard. Thus, when the user places his or her hands at the touch-sensitive area, the transparent keyboard appears at the touch-sensitive area within the display screen. When the user removes his or hands from the touch-sensitive input area, the transparent keyboard vanishes. The keyboard itself can be an ergonomic keyboard.

In addition, physical characteristics associated with the user can be analyzed, while the user is entering a particular sequence of data utilizing the touch-sensitive keyboard, in order to customize the keyboard according a user's physical characteristics and personal preferences. In response to analyzing such physical characteristics, the touch-sensitive keyboard is configured so that the sensitivity of the touch-sensitive keyboard may be raised or lowered according to the physical characteristics associated with the user.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
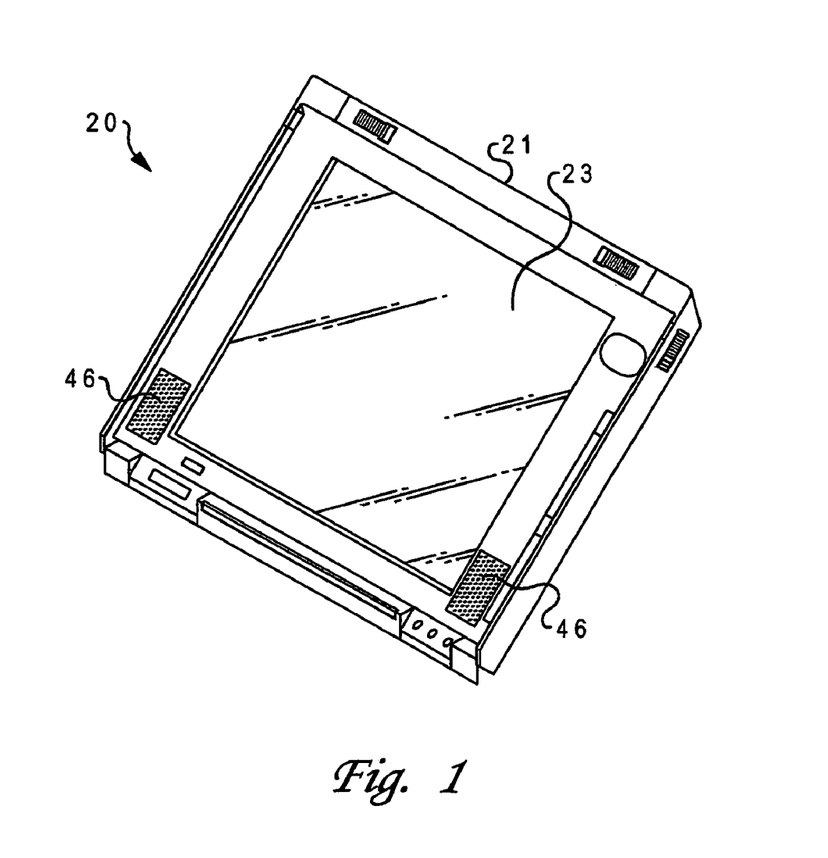
FIG. 1 illustrates a pictorial representation of a computer system, which may be utilized to implement a preferred embodiment of the present invention.

With reference now to the figures and in particular with reference to FIG. 1, there is depicted a pictorial representation of a computer system, which may be utilized to implement a preferred embodiment of the present invention. A computer system 20 is depicted that includes a system unit 21, speakers 46 and a video display 23. Computer system 20 includes a graphical user interface that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation. A touch screen display is utilized in a 5 association with computer system 20 to convey visual data and receive input from a user. Such a touch screen may also utilize or incorporate graphical user interface features.

Figure 2:
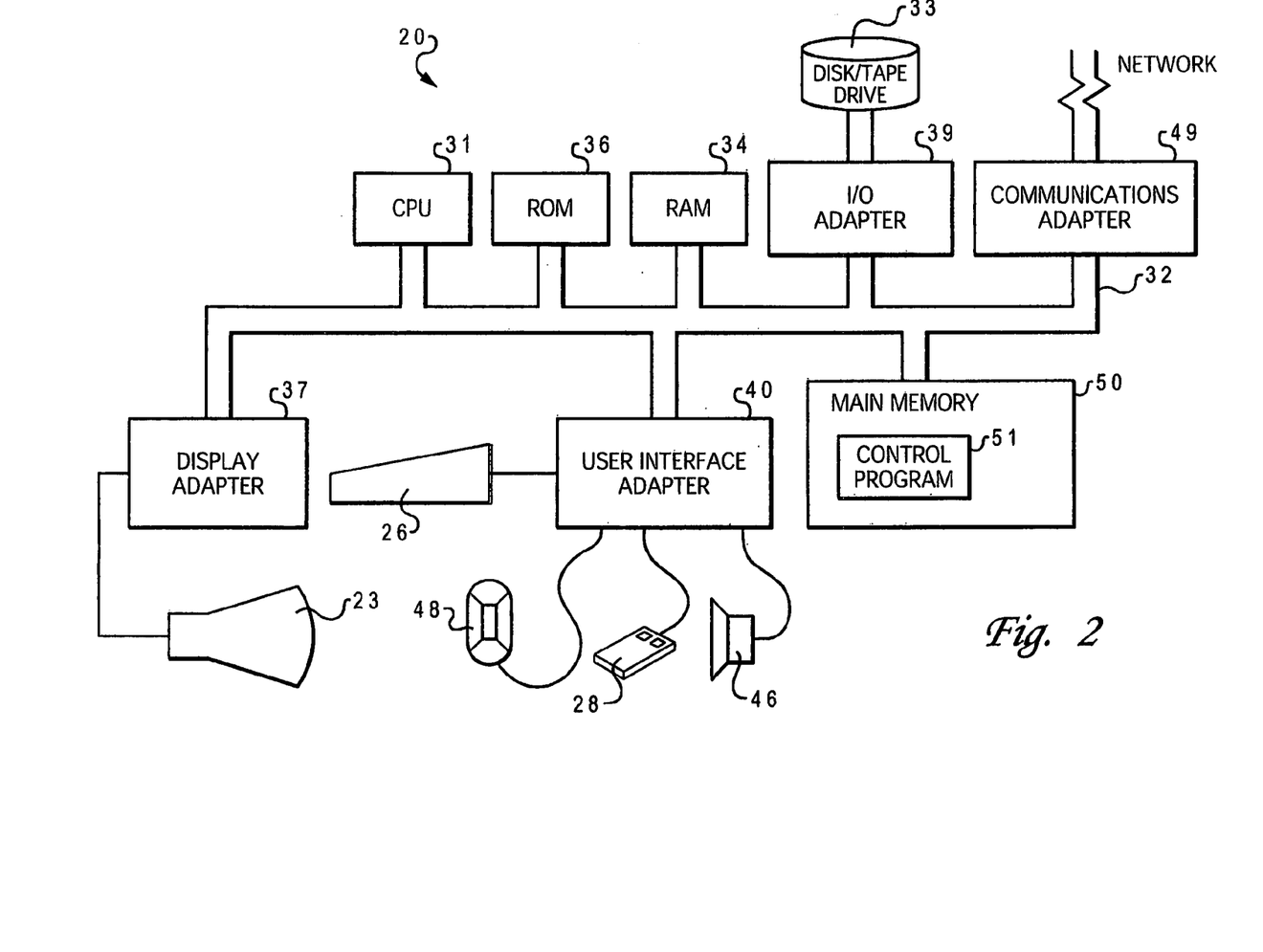
FIG. 2 depicts a representative hardware environment of a computer system, which may be utilized to implement a preferred embodiment of the present invention.

FIG. 2 depicts a representative hardware environment of computer system 20 of FIG. 1, which may be utilized to implement a preferred embodiment of the present invention. System unit 21 of FIG. 1 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 23, and I/O adapter 39 for connecting peripheral devices such as disk and tape drives 33 to system bus 32.

Disk and tape drives 33 are electro-mechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or micro-floppy (e.g., 3.5 inch) disk is encased in a protective plastic jacket. A hard disk, which is very finely machined, is typically enclosed in a rigid case and can be exposed only in a dust free environment.

Video display 23 is the visual output of computer system 20. Video display 23 can be, for example, a CRT-based video display well-known in the art of computer hardware. "CRT" is an acronym for cathode-ray tube. Video display 23 can also be implemented as an LCD-based or a gas plasma-based flat-panel display. "LCD" is an acronym for liquid crystal display. Those skilled in the art can thus appreciate that computer system 20 may be modified to be implemented as a notebook-based computer. Computer system 20 may further include user interface adapter 40 for connecting keyboard 26, mouse 28, speaker 46 (i.e., analogous to speakers 46 of FIG. 1), microphone 48, and/or other user interface devices to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a graphical user interface that resides within a machine-readable media to direct the operation of computer system 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIX-windows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
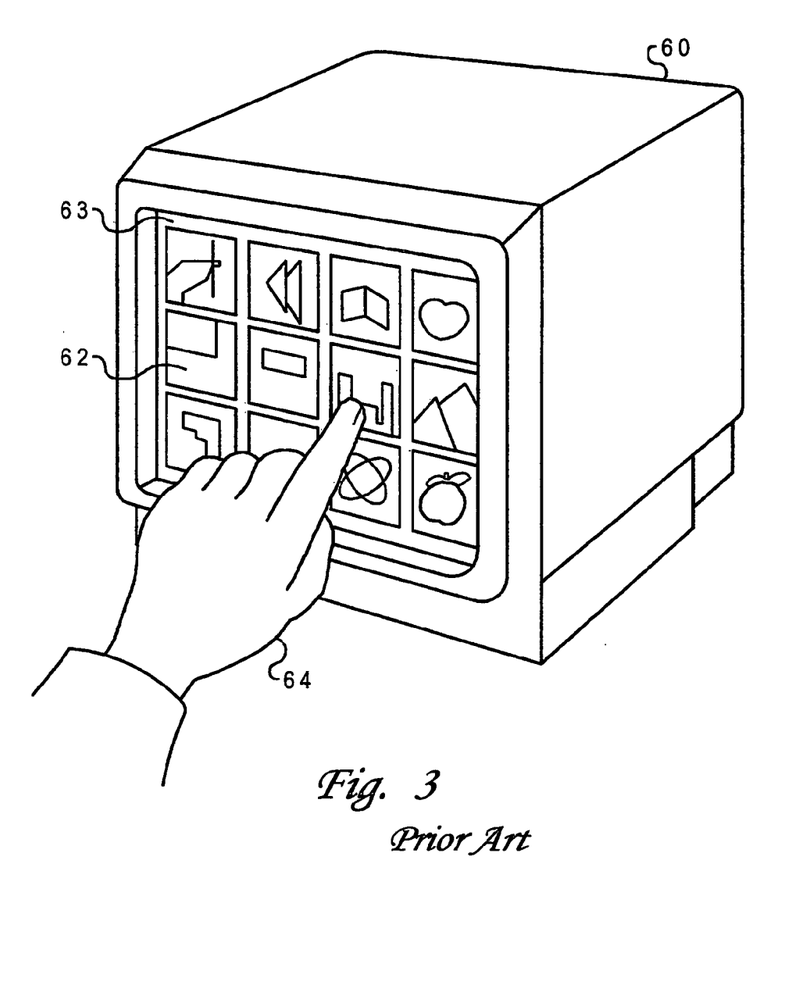
FIG. 3 illustrates a pictorial representation of a prior art touch screen display.

FIG. 3 illustrates a pictorial representation of a prior art touch screen display 60. Touch screen display 60 is a specialized computer display screen which is designed to recognize the location of a touch on the surface of the screen (i.e. touch screen 63). By touching the screen, the user can make a selection or move a cursor. Although not depicted in FIG. 3, those skilled in the art will appreciate that touch screen display 60 may be implemented on a portable computer display, such as the compact computer system illustrated in FIG. 1. Display 23 of FIG. 1 may be implemented as a compact version of touch screen display 60 of FIG. 3.

Touch screen 63 can be composed of one or more sensing line grids, which determine the location of a touch by matching vertical and horizontal contacts. In addition, touch screen display may include an electrically charged surface and sensors around the outer edge of the screen to detect the amount of electrical disruption and pinpoint exactly where contact has been made. Touch screen display 60 may also include infrared light-emitting diodes (LEDs) around the outer edges of the screen (i.e., touch screen 63), which together with additional sensors, create an invisible infrared grid, which the user's finger interrupts, in front of the screen.

Thus, according to the diagram depicted in FIG. 3, a user's hand 64 (i.e., particularly a user's fingers) may touch keys 62, which are graphically displayed within touch screen display 60. By touching a particular key, such as a key 62, a series of data-processing operations associated with that particular key, may be initiated. Touch screen 63 of touch screen 60 is thus a display device that allows the user to interact with a computer system, such as computer system 20 of FIG. 1 and FIG. 2, by touching a particular area on the screen.

A preferred embodiment of the present invention calls for a merging of the display area and a keyboard input area utilizing touch screen technology. When a user places his or her hands over the bottom half or two-thirds of the touch screen display, a translucent keyboard appears under his or her fingers. The current text or graphics displayed on the touch screen display will still be seen through the keyboard. However, when the user touches the graphically displayed keyboard "keys," keyboard input is reflected onto the screen immediately behind the graphically displayed keyboard. The keyboard is in essence a "phantom" keyboard, in that it appears and vanishes depending upon the presence of a particular user input, such as the placement of a user's hands near a designated area on the touch screen. When graphically displayed on the screen, the keyboard is transparent, such that any data (e.g., words or paragraphs) that were displayed prior to the display of the transparent keyboard are visible "below" the keyboard.

Figure 4:
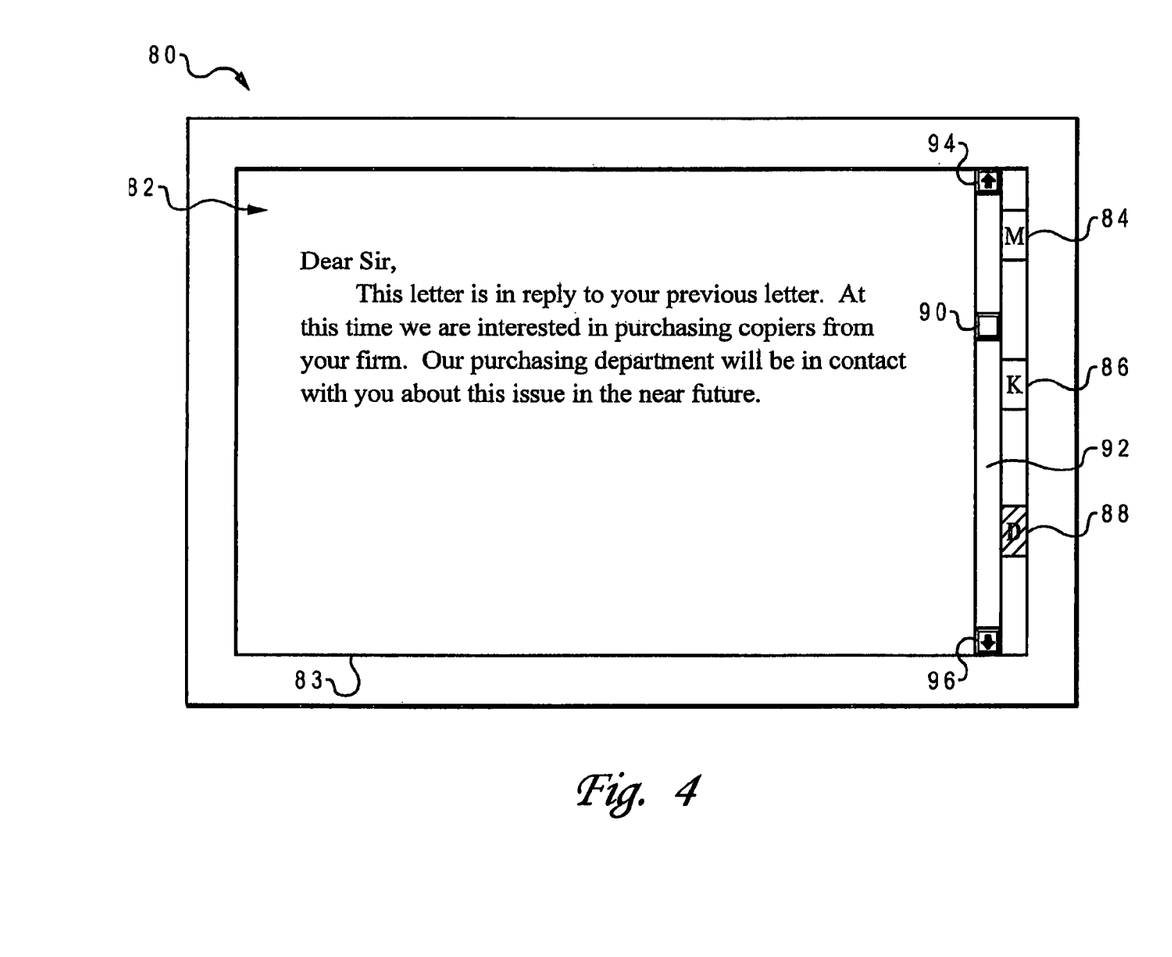
FIG. 4 depicts a pictorial representation of a document displayed within a graphical user interface window in a normal display mode, in accordance with a preferred embodiment of the present invention.

In FIG. 4, FIG. 5, and FIG. 6, and FIG. 7 similar parts are indicated by identical reference numerals. FIG. 4 depicts a pictorial representation of a document 82 displayed within a graphical user interface window 83 in a normal display mode, in accordance with a preferred embodiment of the present invention. The graphical user interface, as described previously, is a type of computer interface composed of a visual metaphor reflecting a real-world scene, often of a desktop. Within this scene are icons, representing actual objects, that the user may access and manipulate with a pointing device.

Window 80 includes specific icons, which when manipulated by a user via a pointing device, allow a user to scroll up or down through document 82. For example, down-arrow 96 allows a user to scroll downward, while up-arrow 94 allows a user to scroll upward through document 82.

Down-arrow 96, up-arrow 94 and slider 90 are positioned within scroll bar 92. Scroll bar 92 is a graphical device that can be utilized to change a user's viewpoint of a list or data file. The user alters the view by sliding slider 90 up or down in the scroll area or by pressing one of the scroll arrows (i.e., down-arrow 96 or up-arrow 94), which causes the view to scroll up or down in the window area adjacent the scroll bar. Window 83 additionally includes an area in which "M," "K," and "D" graphical buttons are located (i.e., "M" button 84, "K" button 86, and "D" button 88). As described herein, "M" button 84 initiates a "mouse" mode, "K" button 86 initiates a "keyboard" mode, and "D" button 88 initiates a normal display mode. As indicated by the shaded "D" button 88, window 83 of FIG. 4 depicts a normal display mode.

Figure 5:
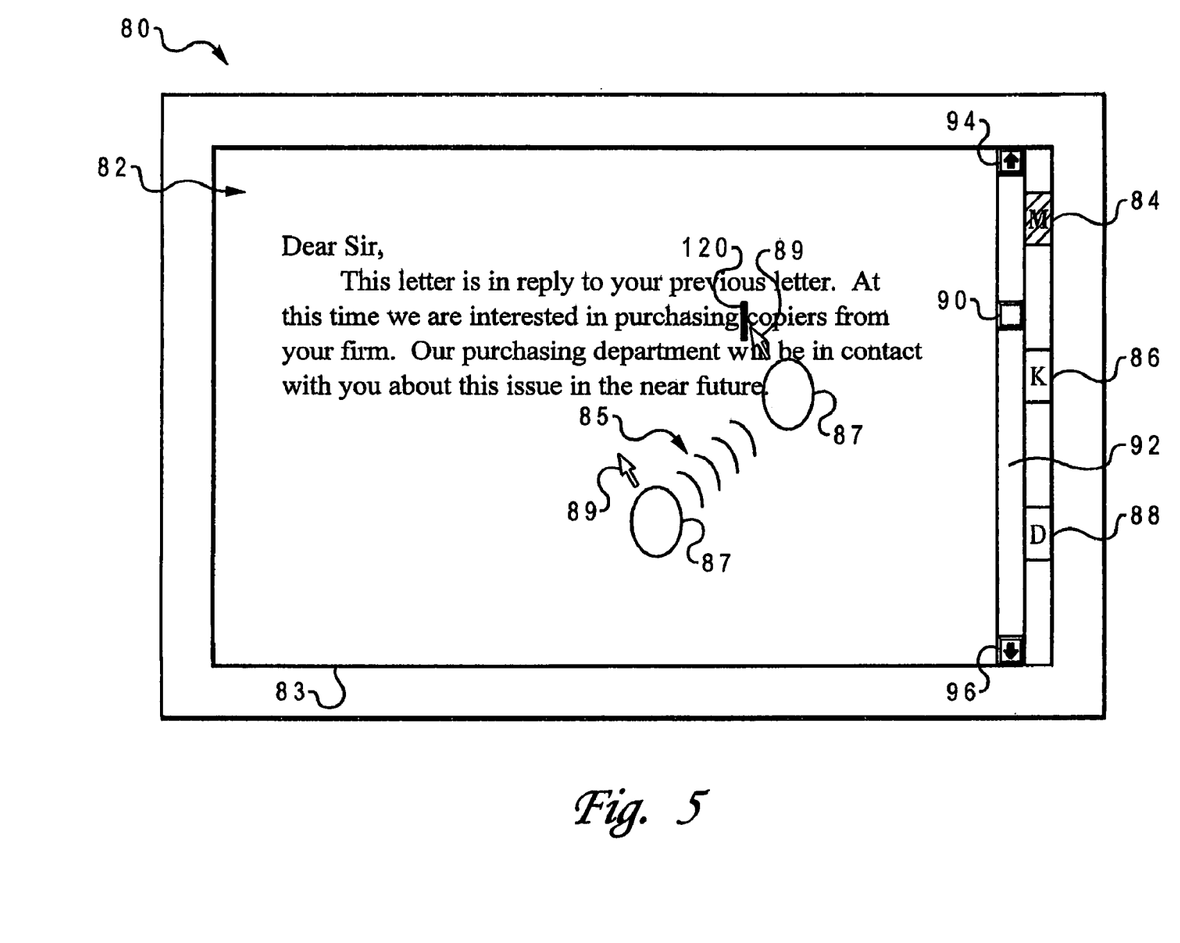
FIG. 5 illustrates a pictorial representation of a document displayed within a graphical user interface window in a mouse mode, in accordance with a preferred embodiment of the present invention.

FIG. 5 illustrates a pictorial representation of document 82 displayed within graphical user interface window 83 in a mouse mode, in accordance with a preferred embodiment of the present invention. Cursor 120 indicates a position within document 82 from which a user might begin editing document 82. The document displayed within window 83 of FIG. 5 is in a "mouse mode, as indicated by shaded "M" button 84. The user may manipulate document 82 utilizing a pointing device such as a mouse. Because the graphical user interface depicted in FIG. 5 is implemented on a touch screen device, the user merely places an index finger at mouse pointer 89 and moves the mouse pointer toward the desired area. Movement of the mouse pointer is indicated in FIG. 5 by curved lines 85. Circle 87 indicates the actual position of a user's finger on the touch screen as the mouse pointer 89 is moved toward cursor 120.

Figure 6:
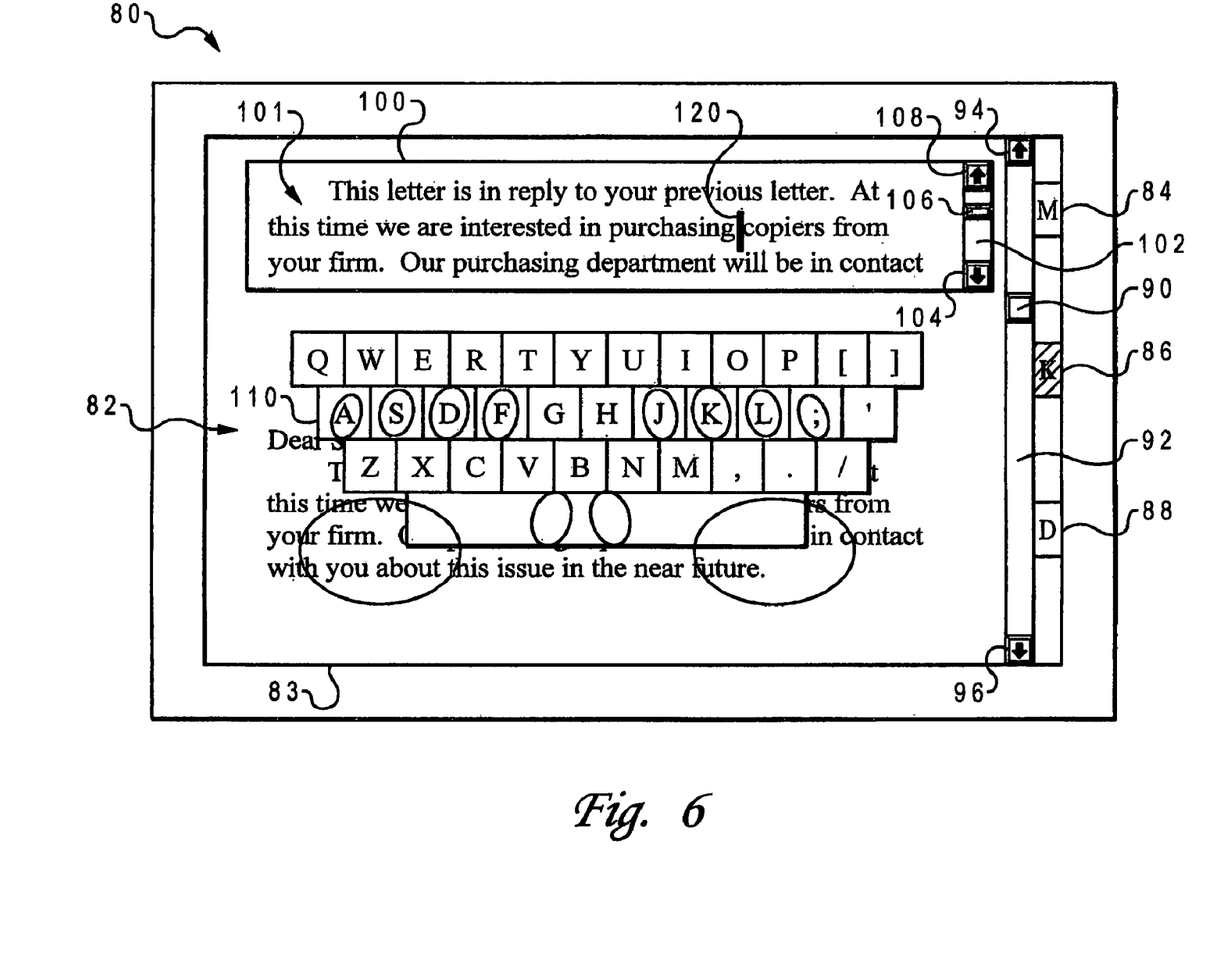
FIG. 6 depicts a pictorial representation of graphical user interface window displayed in a keyboard mode, in accordance with a preferred embodiment of the present invention.
Figure 7:
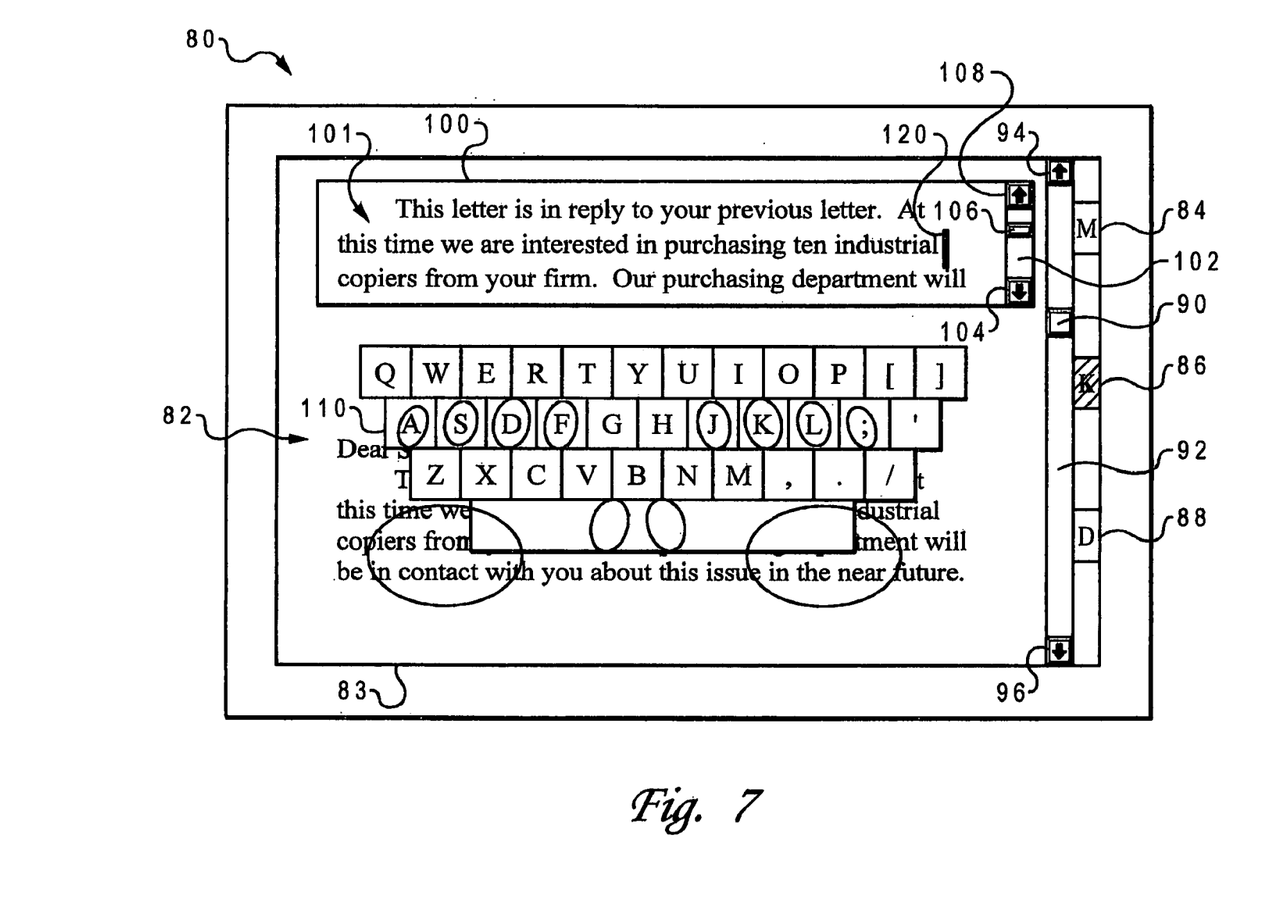
FIG. 7 illustrates a pictorial representation of graphical user interface window displayed in a keyboard mode following manipulation of a document by a graphical keyboard, in accordance with a preferred embodiment of the present invention.

FIG. 6 depicts a pictorial representation of graphical user interface window 83 displayed in a keyboard mode, in accordance with a preferred embodiment of the present invention. FIG. 7 illustrates a pictorial representation of graphical user interface window 83 displayed in a keyboard mode following manipulation of document 82 by keyboard 110, in accordance with a preferred embodiment of the present invention. The keyboard mode is indicated by shaded "K" button 86. When the graphical user interface window functions in a keyboard mode, a user can place his or her hands over the bottom half or two-thirds of display screen 80. Touch screen technology detects the presence of the user's hands in these areas.

Thus, when the user's hands are detected, a translucent or transparent keyboard 110 appears beneath the user's fingers on display screen 80. Although not depicted specifically in FIG. 6 and FIG. 7, current text, graphics or other documents will still be visible through the keyboard. When the user touches the "keys" displayed on display screen 83, keyboard input is reflected onto the screen beneath transparent keyboard 110. Those skilled in the art will appreciate that the circles depicted on transparent keyboard 110 indicate where a user's hands can be positioned to manipulate the keyboard. For example, a user's left hand fingers may be positioned respectively on the "A", "S", "D," "F" and space bar keys, while a user's right hand fingers may be positioned at the ";", "L", "K", "J" and space bar keys. The larger circles depicted in FIG. 6 and FIG. 7 indicate the position of the user's palms. If the user takes his or hands away from the touchscreen surface, the projected keyboard fades away. If a user's hand is then detected at the touchscreen, the keyboard reappears. This hide and display action continues until an option other than a "K" mode is selected.

Because the user must also be able to see the actions associated with his or her typing, a smaller "active" window 100, is displayed to indicate the actual typing taking place. Window 100 includes a scroll bar 102 having a slider 106, an up-arrow 108, and a down-arrow 104 which functions similar to the scroll bar, slider and arrows associated with window 83. Of course, as indicated previously, the actions performed via keyboard input are simultaneously displayed in the actual text that resides "beneath" keyboard 110, as well as in window 100. Window 100 thus includes a document 101, which is in essence, a smaller version of document 82.

If the user has the need to manipulate document 82 with a mouse, the user simply moves his or her hands away from the keyboard, and touches "M" button 84. A mouse pointer (e.g., mouse pointer 89) subsequently appears and transparent keyboard 110 vanishes from sight. The user can then manipulate the mouse or other pointing device for object selection or drag. When the user finishes this task, the user then touches "K" button 86, which places the display screen back into the keyboard mode. When the user's hands approach display screen 80 (i.e., when the presence of the user's hands at the display screen are detected), the keyboard materializes on the display screen beneath his or her fingers. Various levels of translucency can be specified by the user.

Thus, transparent keyboard 110 is that part of computer system 20 of FIG. 1 that resembles a typewriter keyboard and which enables a user to control particular aspects of the computer. Transparent keyboard 110 can include a standard set of printable characters presented in a QWERTY pattern typical of most typewriters. In addition, transparent keyboard 110 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either displayed text or cursors.

Figure 8:
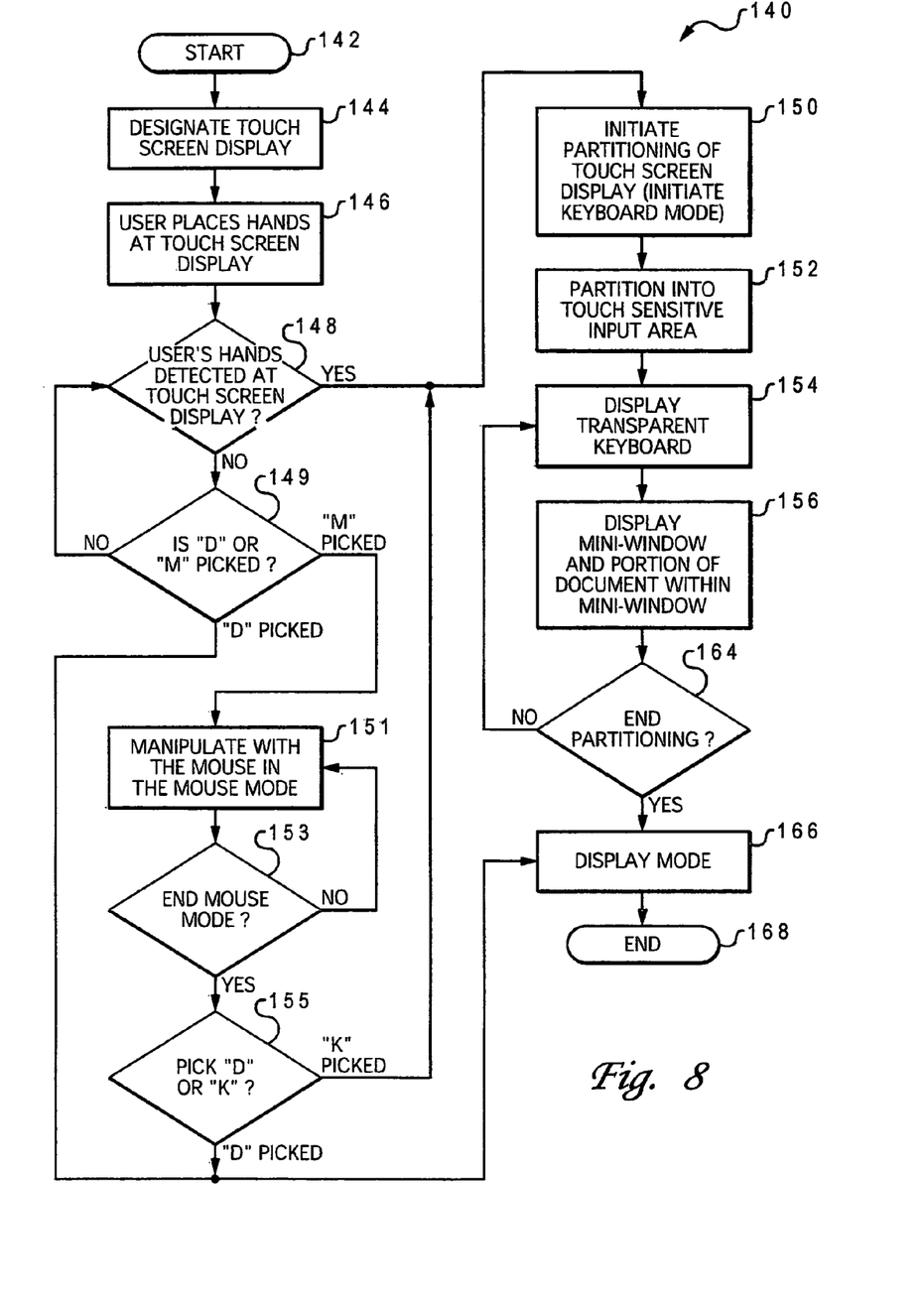
FIG. 8 depicts a high-level flowchart of operations illustrating a method for keyboard and display space saving in a touch screen display, in accordance with a preferred embodiment of the present invention.

FIG. 8 depicts a high-level flowchart of operations 140 illustrating a method for keyboard and display space saving in a touch screen display, in accordance with a preferred embodiment of the present invention. It can be appreciated by those skilled in the art that FIG. 8 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "displaying" or "partitioning," which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as the computer system depicted in FIG. 1 and FIG. 2, and associated touch screen displays such as the touch screen display depicted in FIG. 3, in processing electrical or other (e.g. mechanical, chemical) physical signals to generate other desired physical signals.

Thus, as illustrated at block 142, the process depicted in FIG. 8, is initiated, as indicated by the phrase "START." As described at block 144, a touch screen display is designated, such as the touch screen display depicted in FIG. 3 herein. A document that the user wishes to manipulate or edit may be displayed on the touch screen display (i.e., also referred to simply as a "display screen"). Those skilled in the art will of course appreciate that the touch screen display designated, according to block 144, may be implemented in "laptop" or "notebook" form as a flat screen placed horizontally on a flat surface from which a user may manipulate the "phantom" keyboard that appears as a result of the operations described herein. As illustrated at block 146, the user places his or her hands at the touch screen display. In a preferred embodiment of the present invention, the user's hands may be placed over the bottom half or two-thirds of the touch screen display.

As indicated at block 148, a test is performed to determine if the user's hands are located over the appropriate area of the touch screen display (e.g., at the bottom half or two-thirds of the display). A detection device is utilized to detect the user's hands. Such a device may detect the user's hands via sound or heat detection, although such detection techniques are not necessary features of the present invention. Assuming that the user's hands are detected, then as described at block 150, partitioning of the touch screen display is initiated. Thereafter, as described at block 152, the actual partitioning occurs wherein the display screen is partitioned into a touch-sensitive input area and a display area, wherein data input at the touch-sensitive input area may be simultaneously displayed in the display area, in response to a particular user input (e.g., "typing" on a graphically displayed touch sensitive keyboard), such that the partitioning of the display screen promotes increased portable computer compactness by decreasing user input and display areas.

As illustrated at block 154, a transparent keyboard is thus displayed within the touch-sensitive input area. The transparent or translucent keyboard "appears" under the user's fingers. The current text or graphics can still be seen "through" the keyboard, however when the user touches the keyboard graphical "keys" displayed on the display screen, the keyboard input is reflected onto the screen area "beneath" the keyboard." Because it is necessary for the user to be able to view the actions associated with his or typing, the top portion of the display screen is reserved for a "mini-window," as indicated at block 156. The mini-window displays a portion of the document that the user wishes to edit. Those skilled in the art will appreciate that the display of the mini-window does not in fact constitute a separate output device. The display and the keyboard constitute the same physical device (i.e., the touchscreen). Any changes made to the mini-screen are also made to the text "hidden" or "obscured" by the displayed transparent keyboard.

As indicated at block 164, a test is performed to determine whether to discontinue partitioning and return the display screen to a "normal" or non-partitioned mode or to continue operating under the partition (i.e., "keyboard mode"). If the display screen continues under a "keyboard mode," then the processing beginning, as described at block 154, is repeated. If the user desires to return to a "display mode," in which the mini-window and the keyboard vanish and the text is simply displayed on the screen, then the operation illustrated at block 166 is processed. The process may subsequently terminate, as indicated by the word "END," as described at block 168.

As illustrated at block 148, if the user's hands are not detected at the touch screen display, then a test is performed, as indicated at block 149, to determine whether or not a "D" or an "M" was chosen by the user. Choosing a "D" initiates a the "display mode" described at block 166. Choosing "M" initiates a "mouse mode," as described at block 151, in which the user can manipulate the text displayed on the screen with a mouse or other similar pointing device. Thus, if the user wishes to manipulate the document with a mouse, the user may operate the display screen in a so-called "mouse mode" by removing his or her hands from the keyboard and touching a graphically displayed screen button with the word "MOUSE" or simply the letter "M." Once in the "mouse mode," as indicated at block 151, a mouse pointer appears and the translucent keyboard vanishes.

The user may manipulate the mouse for object selection or dragging of object data. As subsequently indicated at block 153, a test is performed to determine whether or not to end the "mouse mode" or continue. If the user desires to continue operating under the "mouse mode," then as depicted at block 151 the process simply continues. If the user discontinues operation of the display under the "mouse," then as illustrated at block 155, a test is performed to determine whether or not to initiate a "keyboard mode" by choosing the letter "K" or the "display mode" by choosing the letter "D." The letters "K" "D" and "M" and resulting associated functions are illustrated in FIG. 4, FIG. 5, FIG. 6, and FIG. 7 herein. If a "keyboard mode" is manually chosen by the user, then the process, as illustrated beginning at block 150, is repeated. If the "display mode" is manually chosen by the user, then the operation, as described at block 166, is processed.

Although not specifically illustrated in flow diagram 140 of FIG. 8, those skilled in the art will appreciate that the displayed touch-screen keyboard itself can be composed of an ergonomic keyboard, customized to be split apart for usability and ergonomics. Although the displayed transparent keyboard is in essence a "virtual" keyboard, those skilled in the art will appreciate that this "virtual" keyboard can be "cut" and "pasted" together in varying positions and rotations to create an ergonomic keyboard. For example, one "half" of the keyboard can reside on the touchscreen in a different X,Y coordinate than the remaining half of the keyboard. The "half" portion of the keyboard can also be selected by a user to encompass more less input keys than an ordinary QWERTY keyboard. Of course, such modifications will depend upon a particular implementation of a preferred embodiment of the present invention.

The keyboard can also be customized according to physical characteristics associated with a particular user. If two or more people share they keyboard/screen, the keyboard can be customized according to width of their respective fingers, their personal preferences, and a "heat sensitivity" index associated with their hands. In order to accomplish this particular task, several basic steps must be performed. First, physical characteristics associated with a particular user must be analyzed while the user is entering a particular sequence of data utilizing the touch-sensitive keyboard. Second, in response to analyzing the physical characteristics associated with that particular user, the touch-sensitive keyboard must be configured such that the sensitivity of the touch-sensitive keyboard may be raised or lowered according to the physical characteristics associated with the user.

Customizing the transparent touch-screen keyboard according to physical characteristics associated with a particular user can be accomplished via a touch screen configuration routine. Such a touch screen configuration routine, when processed, prompts a user to type out a series of sentences utilizing the displayed transparent touch-screen keyboard. The configuration routine must be designated ahead of time by the user. The user must designate parameters that the configuration routine will utilize in subsequent data-processing operations. For example, a user can designate particular heat/sound identification criteria according to a particular portion of the displayed transparent touch-screen keyboard.

As the user types out the sentences via the displayed transparent touch-screen keyboard, an analysis of the user's "fingerprint heat/sound" signature is taken. Once the configuration routine is designated, approval must be given by the user to implement the actual configuration routine. A test can then be performed to determine whether or not user approval for running the configuration routine has been given. If approval by the user is not given, the process simply terminates. However, if approval by the user is given, then the configuration routine is processed within the parameters set earlier by the user. Thereafter, the physical characteristics of the user are analyzed while the user types out the set of sentences via the displayed transparent touch-screen keyboard during running of the configuration routine. Appropriate sensitivities are determined.

In response to analyzing these physical characteristics, the displayed transparent touch-screen keyboard is calibrated according to the identified sensitivities. For example, the heat required to depress a keyboard key far away is registered. On the other hand, the heat needed to depress a nearby key is also registered such that the displayed transparent touch-screen keyboard does not register an inadvertent keystroke due to a user's fingers close proximity to the displayed transparent touch-screen keyboard. Of course, those skilled in the art will appreciate that other sensitivities may also be identified. For example, sound waves associated with a user's fingers may also be utilized to calibrate the displayed transparent touch-screen keyboard.

While the invention has been particularly shown as described with reference to a preferred embodiment, it will be understood by those skilled in the art that various changes in form and detail may be made therein without departing from the spirit and scope of the invention. For example, while in a "display mode" or "D" mode, an external computer keyboard, may be attached to the computer system (i.e., computer system 20) and utilized to manipulate displayed text and graphical object objects. A pointing device, such as an external mouse, may also be attached to the computer system, and utilized in association with the computer keyboard during the "display mode," which differs from the "M" or "mouse" mode in which the graphically displayed touch screen keyboard vanishes and the user manipulates displayed text and objects solely with a mouse or other pointing device.

It is therefore contemplated that such modifications can be made without departing from the spirit or scope of the present invention as defined in the appended claims.

What is claimed is:

1. A method in a portable computer having a display screen for supporting increased portable computer compactness, said method comprising the steps of:

displaying data within said display screen;

partitioning said display screen into a touch-sensitive input area and a display area;

detecting if a user's hands are positioned at said touch-sensitive input area; and graphically displaying a touch-sensitive pad at said touch-sensitive input area, in response to detecting a user's hands positioned at said touch-sensitive area, such that a user may utilize said touch-sensitive pad to enter data to be displayed in said display area.

2. The method of claim 1 further comprising the steps of:
  detecting if said user's hands are no longer positioned at said touch-sensitive input area; and
  concealing said touch-sensitive pad from view, in response to detecting that said user's hands are no longer positioned at said touch-sensitive input area.

3. The method of claim 2 wherein the step of graphically displaying a touch-sensitive pad comprises the step of:
  graphically displaying a touch-sensitive keyboard at said touch-sensitive input area, in response to detecting a user's hands positioned at said touch-sensitive area, such that a user may utilize said touch-sensitive keyboard to enter data to be displayed in said display area.

4. The method of claim 3 wherein the step of graphically displaying a touch-sensitive keyboard comprises the step of:
  graphically displaying a transparent touch-sensitive keyboard at said touch-sensitive input area, in response to detecting a user's hands positioned at said touch-sensitive area, such that a user may utilize said transparent touch-sensitive keyboard to enter data to be displayed in said display area.

5. The method of claim 4 further comprising the step of displaying data in said display area within said display screen, in response to user data entry at said transparent touch-sensitive keyboard.

6. The method of claim 5 wherein the step of graphically displaying a touch-sensitive keyboard comprises the step of:
  graphically displaying a touch-sensitive ergonomic keyboard at said touch-sensitive input area within said display screen, in response to detecting a user's hands positioned at said touch-sensitive area, such that a user may utilize said touch-sensitive ergonomic keyboard to enter data to be displayed in said display area.

7. The method of claim 6 further comprising the steps of:
  analyzing physical characteristics associated with said user while said user is entering a particular sequence of data utilizing said touch-sensitive keyboard; and
  in response to analyzing said physical characteristics, configuring a sensitivity level for said touch-sensitive keyboard according to said physical characteristics.

8. A portable data processing system comprising:
  a display screen and means for displaying data within said display screen;
  means for partitioning said display screen into a touch-sensitive input area and a display area
  means for detecting if a user's hands are positioned at said touch-sensitive input area; and
  means for graphically displaying a touch-sensitive pad at said touch-sensitive input area, in response to detection of a user's hands positioned at said touch-sensitive area, such that a user may utilize said touch-sensitive pad to enter data to be displayed in said display area.

9. The system of claim 8 further comprising:
  means for detecting if said user's hands are no longer positioned at said touch-sensitive input area; and
  means for concealing said touch-sensitive pad from view, in response to detecting that said user's hands are no longer positioned at said touch-sensitive input area.

10. The system of claim 9 wherein said means for graphically displaying a touch-sensitive pad comprises:
  means for graphically displaying a touch-sensitive keyboard at said touch-sensitive input area within said display screen, in response to detection of a user's hands positioned at said touch-sensitive area, such that a user may utilize said touch-sensitive keyboard to enter data to be displayed in said display area.

11. The system of claim 10 wherein said means for graphically displaying a touch-sensitive keyboard at said touch-sensitive input area comprises:
  means for graphically displaying a transparent touch-sensitive keyboard at said touch-sensitive input area within said display screen, in response to detection of a user's hands positioned at said touch-sensitive area, such that a user may utilize said transparent touch-sensitive keyboard to enter data to be displayed in said display area.

12. The system of claim 11 further comprising means for displaying data in said display area within said display screen, in response to user data entry at said transparent touch-sensitive keyboard.

13. The system of claim 12 wherein said means for graphically displaying a touch-sensitive keyboard comprises:
  means for graphically displaying a touch-sensitive ergonomic keyboard at said touch-sensitive input area, in response to detection of a user's hands positioned at said touch-sensitive area, such that a user may utilize said touch-sensitive ergonomic keyboard to enter data to be displayed in said display area.

14. The system of claim 13 further comprising:
  means for analyzing physical characteristics associated with said user while said user is entering a particular sequence of data utilizing said touch-sensitive keyboard; and
  means for configuring a sensitivity level for said touch-sensitive keyboard according to said physical characteristics, in response to analyzing said physical characteristics.

15. A program product that supports increased portable computer compactness, said program product comprising:
  data display instructions for displaying data within a display screen of a portable computer;
  partition instructions for partitioning said display screen into a touch-sensitive input area and a display area;
  detection instructions for detecting if a user's hands are positioned at said touch-sensitive input area; pad display instructions for graphically displaying a touch-sensitive pad at said touch-sensitive input area within said display screen, in response to detection of a user's hands positioned at said touch-sensitive area, such that a user may utilize said touch-sensitive pad to enter data to be displayed in said display area; and
  a computer usable medium encoding said data display instructions, said partition instructions, said detection instructions, and said pad display instructions.

16. The program product of claim 15, wherein said computer usable medium further encodes:
  instruction means for detecting if said user's hands are no longer positioned at said touch-sensitive input area; and
  instruction means for concealing said touch-sensitive pad from view, in response to detecting that said user's hands are no longer positioned at said touch-sensitive input area.

17. The program product of claim 16 wherein said pad display instructions comprise:
  keyboard display instruction for graphically displaying a touch-sensitive keyboard at said touch-sensitive input area, in response to detection of a user's hands positioned at said touch-sensitive area, such that a user may utilize said touch-sensitive keyboard to enter data to be displayed in said display area.

18. The program product of claim 17 wherein said keyboard display instructions graphically display a transparent touch-sensitive keyboard at said touch-sensitive input area within said display screen, in response to detection of a user's hands positioned at said touch-sensitive area, such that a user may utilize said transparent touch-sensitive keyboard to enter data to be displayed in said display area.

19. The program product of claim 18 wherein said data display means displays data in said display area within said display screen, in response to user data entry at said transparent touch-sensitive keyboard.

20. The program product of claim 19 wherein said keyboard display instructions graphically display a touch-sensitive ergonomic keyboard at said touch-sensitive input area, in response to detection of a user's hands positioned at said touch-sensitive area, such that a user may utilize said touch-sensitive ergonomic keyboard to enter data to be displayed in said display area.

21. The program product of claim 20, wherein said computer usable medium further encodes:
   analyzing instructions for analyzing physical characteristics associated with said user while said user is entering a particular sequence of data utilizing said touch-sensitive keyboard; and
   means for configuring a sensitivity level for said touch-sensitive keyboard according to said physical characteristics, in response to analyzing said physical characteristics.

* * * * *